(12) United States Patent
Horiguchi (10) Patent No.: US 8,618,467 B2
(45) Date of Patent: Dec. 31, 2013

(54) ABSOLUTE ENCODER THAT DETECTS AN ABSOLUTE POSITION OF AN OBJECT

(75) Inventor: Haruhiko Horiguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 203 days.

(21) Appl. No.: 13/176,300

(22) Filed: Jul. 5, 2011

(65) Prior Publication Data

US 2012/0001063 A1     Jan. 5, 2012

(30) Foreign Application Priority Data

Jul. 5, 2010    (JP) ................................ 2010-153098

(51) Int. Cl.
*G01D 5/34*     (2006.01)

(52) U.S. Cl.
USPC .................................................. 250/231.18

(58) Field of Classification Search
USPC ............ 250/231.1–231.18, 568; 33/706, 707, 33/1 N, 1 PT; 341/13, 14; 365/163–165; 356/616–617
See application file for complete search history.

(56) References Cited

U.S. PATENT DOCUMENTS 5,010,655 A * 4/1991 Rieder et al. .................... 33/706
7,608,813 B1 10/2009 Milvich et al.

FOREIGN PATENT DOCUMENTS

| EP | 2006642 A2 | 12/2008 |
|----|------------|---------|
| JP | 2006-170788 A | 6/2006 |
| JP | 2009-002702 A | 1/2009 |

OTHER PUBLICATIONS

Extended European Search Report issued Nov. 4, 2011 for corresponding EP Patent Application No. 11170482.

* cited by examiner

*Primary Examiner* — Thanh Luu
*Assistant Examiner* — Renee Naphas
(74) *Attorney, Agent, or Firm* — Rossi, Kimms & McDowell LLP (57) ABSTRACT

An absolute encoder (100) includes a scale portion (41) movable along with the object and including first and second track (42, 43) having first and second slits (44, 45), a light source (1) that illuminates a light onto the first and second slits, a first detector (9) that detects a first signal obtained from a light from the first slit, a second detector (10) that detects a second signal obtained from a light from the second slit, and a calculator (25, 27) that calculates an absolute position of an object based on the first and second signals. The second slit is formed so that a reflected light intensity or a transmitted light intensity is different in accordance with a position in a moving direction of the scale portion. The calculator obtains an upper-level signal, a middle-level signal, and a lower-level signal to calculate the absolute position.

8 Claims, 10 Drawing Sheets

ABSOLUTE ENCODER THAT DETECTS AN ABSOLUTE POSITION OF AN OBJECT

BACKGROUND OF THE INVENTION

1. Field of the Invention

The present invention relates to an absolute encoder that detects an absolute position of an object.

2. Description of the Related Art

Previously, as an apparatus that measures a moving distance of an object, an absolute encoder capable of performing a length measurement of an absolute position in addition to an incremental encoder that measures a relative moving distance has been known.

Japanese Patent Laid-Open No. 2006-170788 discloses an absolute encoder having one track in which a length of an incremental pattern changes in accordance with a position in a scale portion, which is configured so that a reflected light intensity changes in accordance with a relative moving amount of the scale portion and a sensor unit. This absolute encoder is configured to be able to detect an absolute position of an object by the change of the light intensity in accordance with the relative moving amount of the scale portion and the sensor unit.

Japanese Patent Laid-Open No. 2009-002702 discloses an absolute encoder having a three-track configuration by providing a scale portion with an exclusive track for obtaining absolute information.

However, in the absolute encoder disclosed in Japanese Patent Laid-Open No. 2006-170788, an error is accumulated when a variation of the light intensity of the light source is generated or an external noise is generated.

On the other hand, when the three-track configuration such as the absolute encoder disclosed in Japanese Patent Laid-Open No. 2009-002702, the size of whole of the absolute encoder including the sensor unit and the scale portion is enlarged, and the cost is increased. Furthermore, in the configuration disclosed in Japanese Patent Laid-Open No. 2009-002702, good detection accuracy in a vernier detection cannot be obtained because a signal cannot be obtained in an area where the signal amplitude is zero. In the method of the vernier detection, it is difficult to guarantee the synchronization of the absolute position in all strokes when a longitudinal direction of the scale portion is long in the scale portion having a two-track configuration. In order to avoid this accuracy deterioration, the size of the sensor unit needs to be enlarged in a moving direction of the scale portion, and it prevents the reductions of the size and the cost. Furthermore, it is difficult to uniformly illuminate a light in a wide range of the scale portion since the sizes of the scale portion and the sensor unit are enlarged, and it contributes to the accuracy deterioration.

SUMMARY OF THE INVENTION

The present invention provides a small-sized and low-cost, and highly-accurate absolute encoder.

An absolute encoder as one aspect of the present invention measures an absolute position of an object. The absolute encoder includes a scale portion configured so as to be movable along with the object, and including a first track having a first slit formed at a first interval and a second track having a second slit formed at a second interval different from the first interval, a light source configured to illuminate a light onto the first slit and the second slit, a first detector configured to detect a first signal that is obtained from a light reflected on or transmitted through the first slit, a second detector configured to detect a second signal that is obtained from a light reflected on or transmitted through the second slit, and a calculator configured to calculate the absolute position of the object based on the first signal and the second signal. The second slit is formed so that a reflected light intensity or a transmitted light intensity of the light illuminated from the light source is different in accordance with a position in a moving direction of the scale portion. The calculator includes obtaining an upper-level signal based on a voltage value of photocurrent obtained by the second detector or an amplitude value of the second signal, obtaining a middle-level signal by performing a vernier calculation using the first signal and the second signal, obtaining a lower-level signal by performing an arctangent calculation using the first signal, and calculating the absolute position of the object based on the upper-level signal, the middle-level signal and the lower-level signal.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

(First Embodiment)

Figure 1:
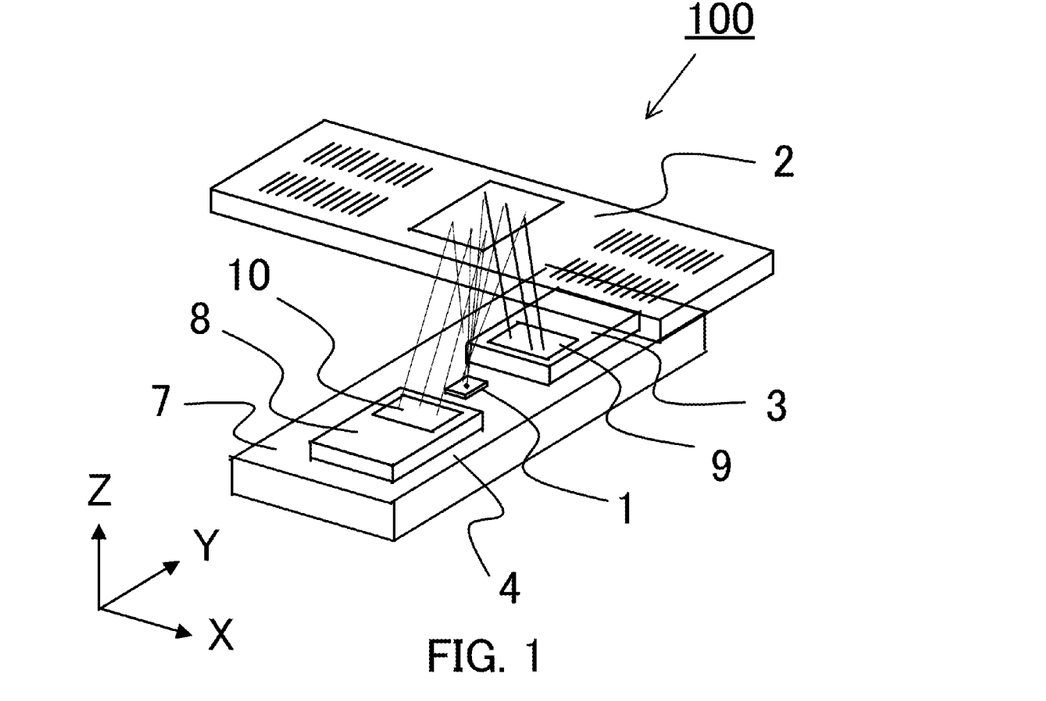
FIG. 1 is a perspective view illustrating a configuration of an absolute encoder in the first embodiment.
Figure 2:
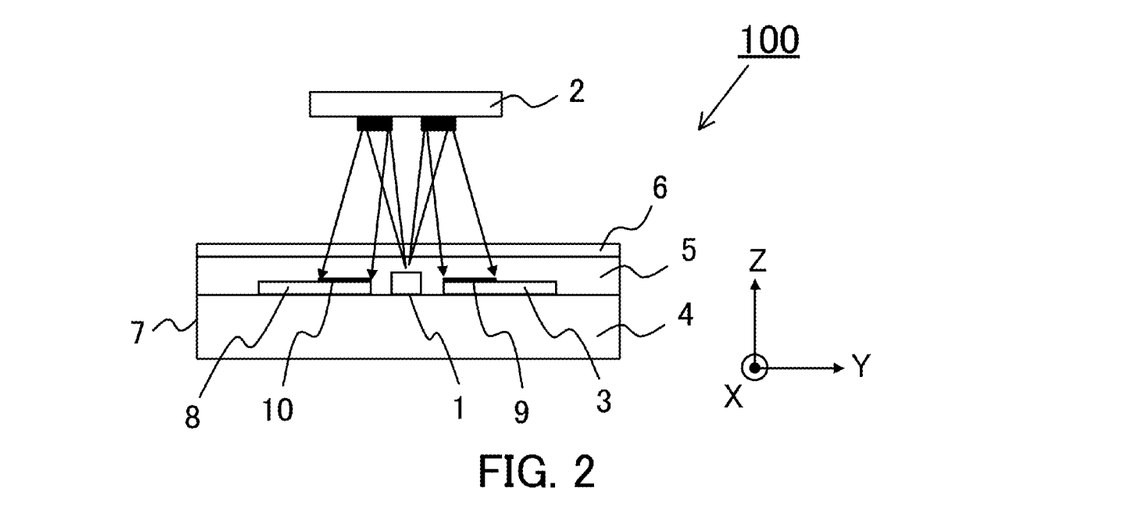
FIG. 2 is a cross-sectional view of the absolute encoder in the first embodiment.

Referring to FIGS. 1 to 10B, a first embodiment of the present invention will be described. FIG. 1 is a perspective view illustrating a configuration of an absolute encoder 100 in the present embodiment, and FIG. 2 is a cross-sectional view of the absolute encoder 100 when viewed in an X axis direction. The absolute encoder 100 measures an absolute position of an object. A scale portion 2 that has two track patterns containing different slit numbers in a total length and having the same intervals is fixed to the moving object, and is configured so as to be movable along with the object in the X axis direction that is a grating array direction. A sensor unit 7 is disposed facing the scale portion 2. The sensor unit 7 is configured by including a light source 1 having an LED chip, semiconductor devices 3 and 8 each having a photo IC chip embedded with two light receiving portions 9 and 10 each having a photodiode array and a signal processing circuit portion, a printed substrate 4 mounting them, and the like. The light source 1 and the semiconductor devices 3 and 8 are molded with a resin 5, and the resin 5 is covered with a transmissive glass substrate 6. In the present embodiment, in order to share parts and reduce the cost, it is preferable that the same type of semiconductor devices are used as the two semiconductor devices 3 and 8. Therefore, in the present embodiment, the semiconductor devices 3 and 8 are configured by using the same types of semiconductor devices, but the embodiment is not limited to this and different types of semiconductor devices from each other may also be used.

Figure 3A:
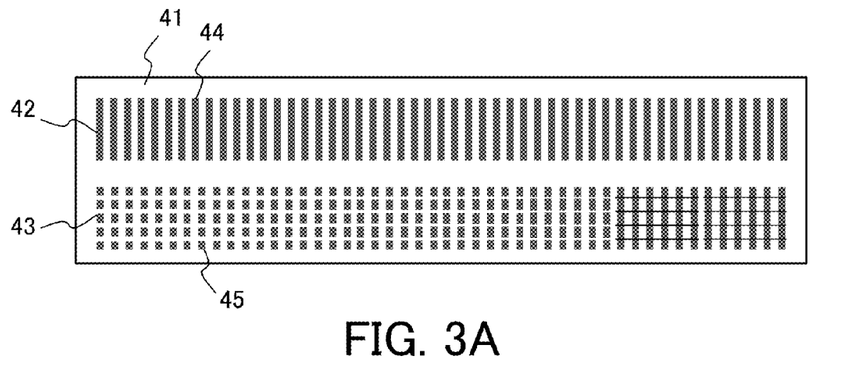
FIGS. 3A and 3B are plan views of a scale portion in the first embodiment.
Figure 3B:
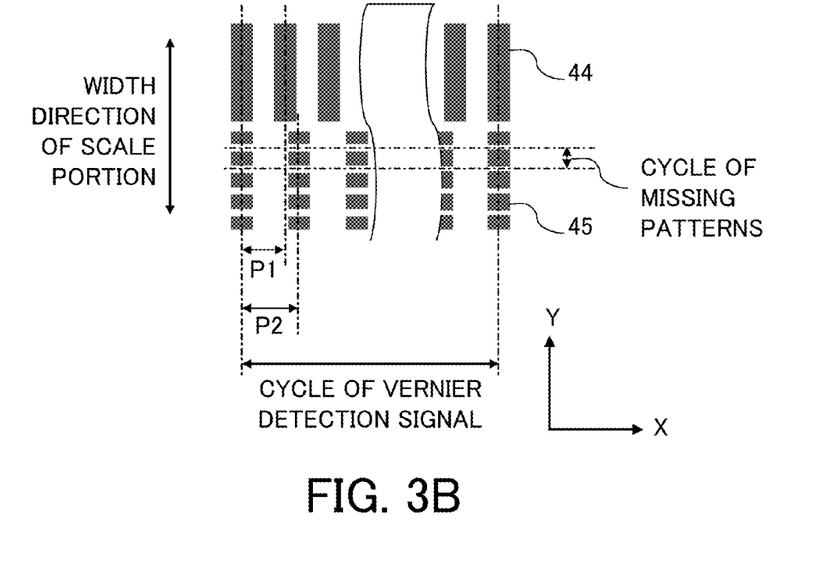

Next, an algorithm of detecting an absolute position in the present embodiment will be described. FIGS. 3A and 3B are plan views of the scale portion in the present embodiment, and FIG. 3A indicates an overall structural diagram of the scale portion and FIG. 3B indicates an enlarged diagram of a part of the scale portion. In FIGS. 3A and 3B, a reflective-type slit pattern is indicated as one example. A scale portion 41 is configured by a glass substrate, and two tracks are formed by patterning a chromium reflection film on the glass substrate. As the substrate constituting the scale portion 41, a material such as silicon other than the glass can also be used. Furthermore, a material such as a thin film other than a flat-plate material may be used. The reflection film may also be formed by using a material other than chromium.

The scale portion 41 is configured by including two tracks of a first track 42 and a second track 43. In the first track 42, a slit 44 (a first slit) that is a reflective pattern is formed at intervals P1 (first intervals). In the second track 43, a slit 45 (a second slit) that is a reflective pattern is formed at intervals P2 (second intervals). The slit 45 in the second track 43 is a pattern that has missing patterns in a width direction of the scale portion 41 (a Y axis direction) at equal intervals (at a predetermined cycle). Furthermore, the slit 45 is formed so that a reflected light intensity or a transmitted light intensity of a light illuminated from the light source 1 is different in accordance with a position of the scale portion 41 in the moving direction (the X axis direction). In the present embodiment, a reflective area or a transmissive area of the light is configured so as to be different (modulated) in accordance with the position of the scale portion 41 in the moving direction.

The cycle of the missing patterns does not have to be the equal intervals, but it is preferable that it has the equal intervals considering the uniformity of the light that reaches the photodiode or the like. When the distance from the light source 1 to the scale portion 41 and the distance from the scale portion 41 to the photodiode are equal to each other, it is preferable that the cycle of the missing patterns is set to ½n of the width of the photodiode, where n is an integer.

The light emitted from the light source 1 is illuminated onto the scale portion 41 on which the reflective pattern of the two tracks (the slits 44 and 45) is formed. The lights illuminated onto the first track 42 on which the slit 44 is formed and the second track 43 on which the slit 45 is formed are reflected to enter the light receiving portion 9 (a first sensor) and the light receiving portion 10 (a second sensor), respectively. The light receiving portion 9 is a first detector that detects a signal (a first signal) obtained from the light reflected on or transmitted through the slit 44 (the first track 42). The light receiving portion 10 is a second detector that detects a signal (a second signal) obtained from the light reflected on or transmitted through the slit 45 (the second track 43). An auto power control (APC) is performed for the light source 1 based on a light intensity obtained by entering the light receiving portion 9 and receiving the reflected light from the first track 42 by the light receiving portion 9 or an amplitude of the signal obtained from the light receiving portion 9 to hold the light intensity entering the light receiving portion 9 or the signal amplitude of the light receiving portion 9 to be constant. This configuration cannot be easily affected by the change with the passage of time such as a variation of the light intensity of the light source.

Figure 4:
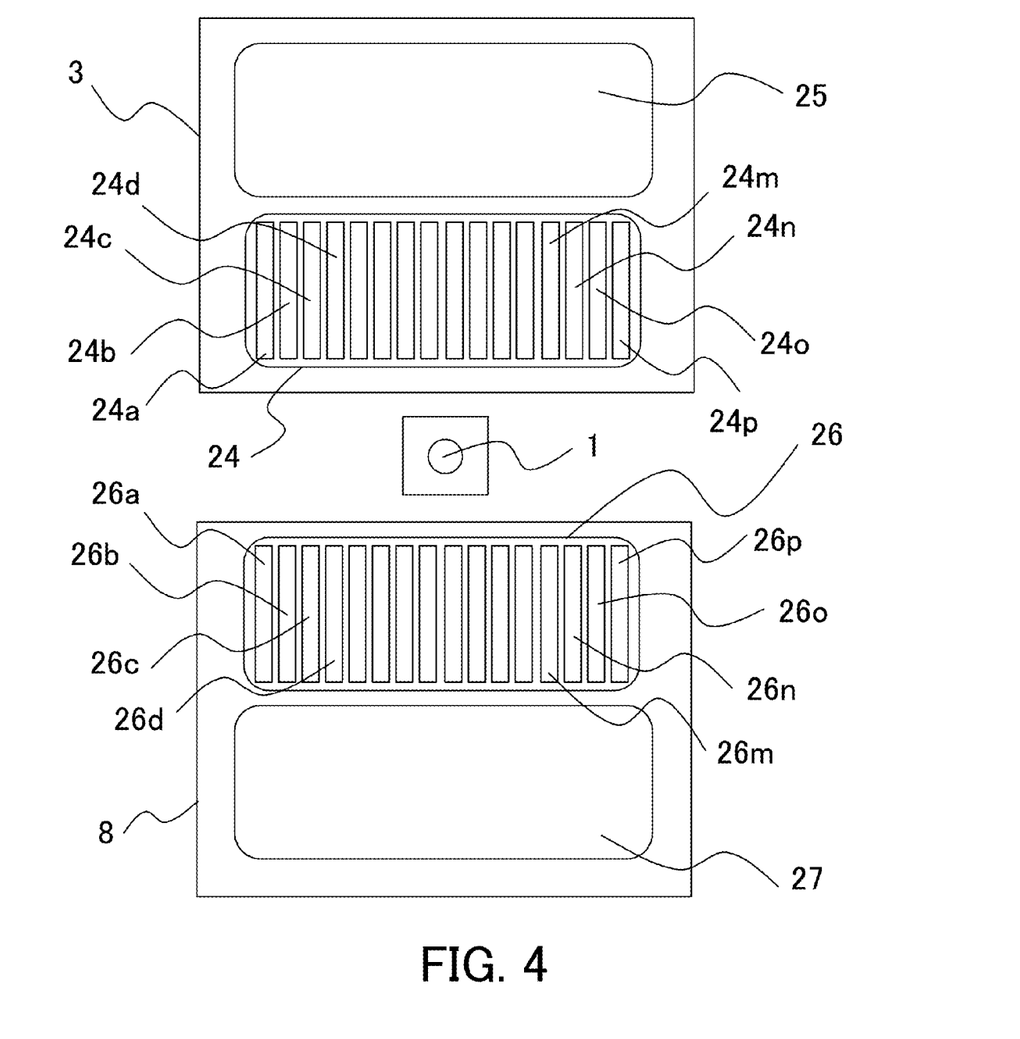
FIG. 4 is a plan view of main parts of a detection head in the first embodiment.

FIG. 4 is a plan view of main parts of a detection head in the present embodiment. As illustrated in FIG. 4, the semiconductor devices 3 and 8 are disposed near the light source 1. The semiconductor device 3 is configured by including a light receiving area 24 disposed at the side closer to the light source 1 and a signal processing circuit portion 25. The semiconductor device 8 is configured by including a light receiving area 26 disposed at the side closer to the light source 1 and a signal processing circuit portion 27. The signal processing circuit portions 25 and 27 perform each kinds of calculations, and constitute a calculator that calculates an absolute position of the object based on the first signal and the second signal along with an upper-level controller (not shown) of the signal processing circuit portions 25 and 27.

In the light receiving area 24, 16 photodiodes 24a, 24b, 24c, 24d, . . . , 24m, 24n, 24o, and 24p are arrayed in a horizontal direction at equal intervals. Similarly, in the light receiving area 26, 16 photodiodes 26a, 26b, 26c, 26d, . . . , 26m, 26n, 26o, and 26p are arrayed in the horizontal direction at equal intervals. The photodiodes 24a, 24e, 24i, and 24m (the photodiodes 26a, 26e, 26i, and 26m) are electrically connected with each other, and this group is defined as an a phase. The group of the photodiodes 24b, 24f, 24j, and 24n (the photodiodes 26b, 26f, 26j, and 26n) is defined as a b phase. Hereinafter, a c phase and a d phase are defined similarly. Each photodiode group of the a phase, b phase, c phase, and d phase outputs photocurrent depending on the light intensity when receiving the light. Along with the movement of the scale portion 2 in the X axis direction, the photodiode groups of the A to D phases output current that varies in accordance with the phase relation of 90 degrees for the b phase, 180 degrees for the c phase, 270 degrees for the d phase with reference to the a phase. Each of the signal processing circuit portions 25 and 27 converts this output current into a voltage value by a current-voltage converter and then a differential amplifier obtains a differential component of the a phase and the c phase and a differential component of the b phase and the d phase to output A phase and B phase displacement output signals whose phases are shifted by 90 degrees each other.

Figure 5:
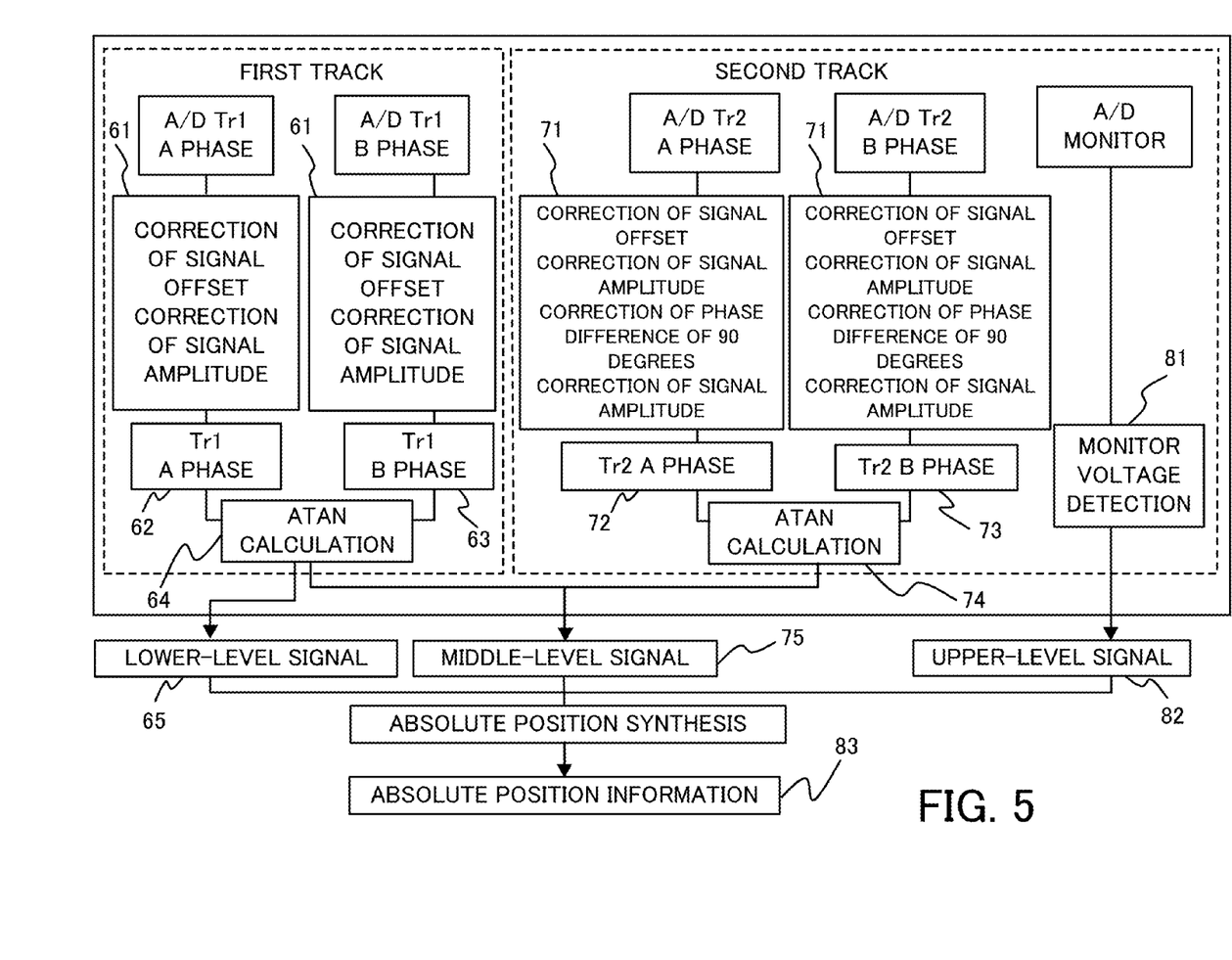
FIG. 5 is a diagram of a block and a flow of a signal processing in the first embodiment.

FIG. 5 is a diagram illustrating a processing block and a processing flow of the signal processing in the present embodiment. FIGS. 6A to 6D are diagrams of a method of correcting the signal in the present embodiment. FIGS. 7A to 7C are diagrams of a synchronous guarantee in detecting absolute position information in the present embodiment. Hereinafter, referring to FIGS. 3A and 3B, 6A to 6D, and 7A to 7C, the signal processing method and the processing flow of detecting the absolute position information in the present embodiment will be described.

Figure 6A:
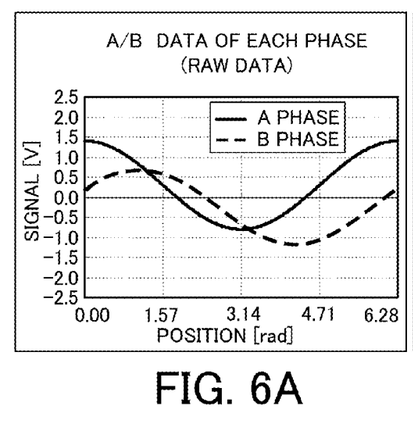
FIGS. 6A to 6D are diagrams of a method of correcting a signal in the first embodiment.
Figure 7A:
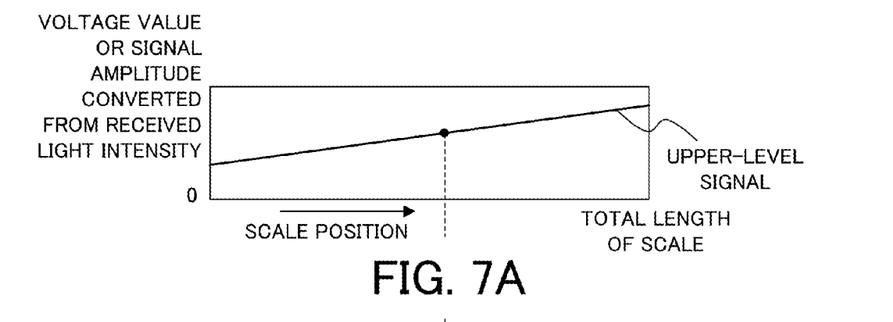
FIGS. 7A to 7C are diagrams of a synchronous guarantee in detecting absolute position information in the first embodiment.
Figure 7B:
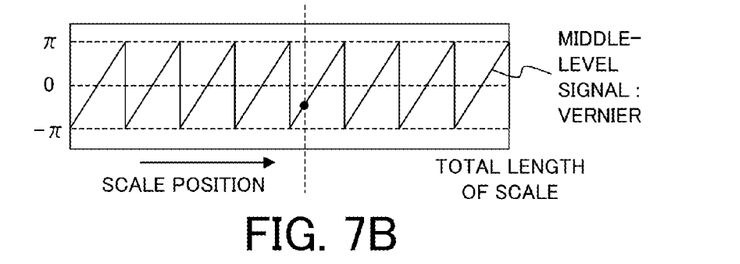
Figure 7C:
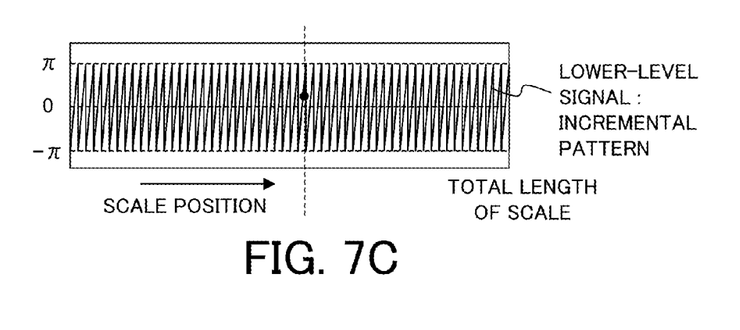

As illustrated in FIG. 6A, the signal offset or the signal amplitude of each of the signals of the A phase and the B phase that are obtained from the first track 42 and the second track 43 is different in some cases. When such signals are used for the algorithm of detecting the absolute position information directly, an error of the detected position is generated and therefore it is necessary to perform a correction 61 of the signal. First of all, a signal offset correction and a signal amplitude correction (the correction 61) for each of the A phase and B phase of the first track 42 and the second track 43 will be described.

Hereinafter, a case in which light receiving portions having the same configuration are used as the light receiving portion 9 and the light receiving portion 10, and the intervals of the four photodiodes in the light receiving portion (for example, the intervals of the photodiodes 24a to 24d) are twice as long as the interval P1 of the first track 42 will be described. The A phase and B phase signals obtained from the first track 42 are represented as the following Expressions (1) and (2) respectively, where a1 and s1 are an amplitude and an offset of the A phase signal respectively, a2 and s2 are an amplitude and an offset of the B phase signal respectively, and $\theta$ is a phase of the signal.

$$A \text{ phase signal: } a1 \times \cos \theta + s1 \quad (1)$$

$$B \text{ phase signal: } a2 \times \sin \theta + s2 \quad (2)$$

For the A phase signal, the maximum value is a1+s1, the minimum value is a1−s1, the signal amplitude is a1, and the average value is s1. For the B phase signal, similarly, the maximum value is a2+s2, the minimum value is a2−s2, the signal amplitude is a2, and the average value is s2. When the A phase and B phase signals represented by Expressions (1) and (2) are corrected by using these values, the A phase signal and the B phase signal are represented as the following Expressions (3) and (4), respectively.

$$A \text{ phase signal: } \{(a1 \times \cos \theta + s1) - s1\} \times a2 = a1 \times a2 \times \cos \theta \quad (3)$$

$$B \text{ phase signal: } \{(a2 \times \sin \theta + s2) - s2\} \times a1 = a1 \times a2 \times \sin \theta \quad (4)$$

Figure 6B:
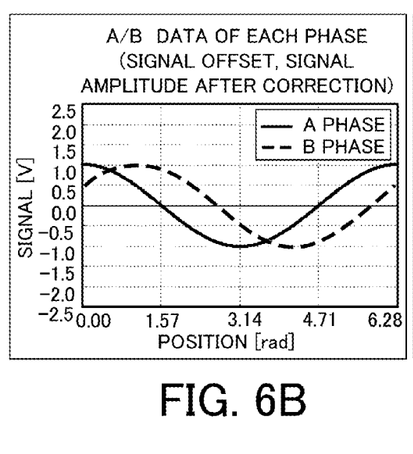

As a result, the offsets of the A phase and B phase signals are removed, and signals 62 and 63 that have the same signal amplitude are obtained (FIG. 6B). Based on the output signals of the A phase and the B phase obtained as described above, a value 64 of arctangent (arctan) that is illustrated in FIG. 7C is calculated. In FIG. 7C, a lateral axis indicates a position of the scale portion, and a vertical axis indicates values of arctangent of the A phase and B phase signals, which are indicated so as to be returned at ±πrad. Thus, the calculator can obtain a lower-level signal 65 by performing an arctangent calculation using the first signal (the A phase and B phase signals).

Next, a method of obtaining a middle-level signal 75 will be described. As illustrated in FIGS. 3A and 3B, the interval P1 (cycle) of the first track 42 and the interval P2 of the second track 43 are configured so as to be slightly different, and the signal obtained by the calculator can be obtained from the phase difference between the interval P1 and the interval P2. For example, when the interval P1 is 100 µm and the interval P2 is 120 µm, a cycle of a vernier signal that is obtained by the calculator in Area 1 is 600 µm that is the least common multiple of them.

Hereinafter, a signal correction of the second track 43 will be described. In order to obtain the vernier signal, since the interval P2 of the second track 43 is different from the interval P1 of the first track 42, the interval (for example, the interval of the photodiodes 26a to 26d) of the four photodiodes in the light receiving portion 10 is not twice as long as the interval P2 of the second track 43. Therefore, the signals of the A phase and the B phase obtained from the second track 43 have a phase relation displaced from 90 degrees.

The signals of the A phase and the B phase that are obtained from the second track 43 are represented as the following Expressions (5) and (6) respectively, where b1 and t1 are an amplitude and an offset of the A phase signal respectively, b2 and t2 are an amplitude and an offset of the B phase signal, $\theta$ is a phase of the signal, and $\alpha$ is a shift amount of the phase.

$$A \text{ phase signal: } b1 \times \cos \theta + t1 \quad (5)$$

$$B \text{ phase signal: } b2 \times \sin(\theta + \alpha) + t2 \quad (6)$$

First of all, similarly to the case of the first track 42, when correction processings (correction 71) of the offset and the amplitude of the signal are performed, the signals of the A phase and the B phase are represented as the following Expressions (7) and (8) respectively.

$$A \text{ phase signal: } \{(b1 \times \cos \theta + t1) - t1\} \times b2 = b1 \times b2 \times \cos \theta \quad (7)$$

$$B \text{ phase signal: } \{(b2 \times \sin(\theta + \alpha) + t2) - t2\} \times b1 = b1 \times b2 \times \sin(\theta + \alpha) \quad (8)$$

In this case, the offsets of the A phase signal and the B phase signal are removed, and as a result signals having the same signal amplitude are obtained (FIG. 6B).

Next, a processing of setting the phase difference of the A phase and the B phase to 90 degrees by using Expressions (7) and (8) will be described. The difference of Expressions (7) and (8) are represented as the following Expression (9).

$$b1 \times b2 \times (\sin(\theta + \alpha) - \cos \theta) = b1 \times b2 \times 2 \times \sin\{(\alpha - 90)/2\} \times \cos\{\theta + (\alpha + 90)/2\} \quad (9)$$

The sum of Expressions (7) and (8) are represented as the following Expression (10).

$$b1 \times b2 \times (\sin(\theta + \alpha) + \cos \theta) = b1 \times b2 \times 2 \times \cos\{(\alpha - 90)/2\} \times \sin\{\theta + (\alpha + 90)/2\} \quad (10)$$

Figure 6C:
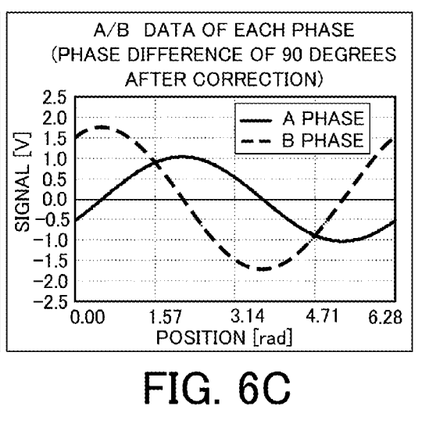

Thus, the phase difference of Expressions (9) and (10) is 90 degrees (FIG. 6C).

Since the amplitudes in Expressions (9) and (10) are different, subsequently corrections of the amplitudes are performed. When Expression (9) is multiplied by $\cos\{(\alpha-90)/2\}$ that is a part of the amplitude of Expression (10) and Expression (10) is multiplied by $\sin\{(\alpha-90)/2\}$ that is a part of the amplitude of Expression (9), the following Expressions (11) and (12) are obtained.

$$b1 \times b2 \times 2 \times \sin\{(\alpha-90)/2\} \times \cos\{(\alpha-90)/2\} \times \cos\{\theta+(\alpha+90)/2\} \quad (11)$$

$$b1 \times b2 \times 2 \times \sin\{(\alpha-90)/2\} \times \cos\{(\alpha-90)/2\} \times \sin\{\theta+(\alpha+90)/2\} \quad (12)$$

Figure 6D:
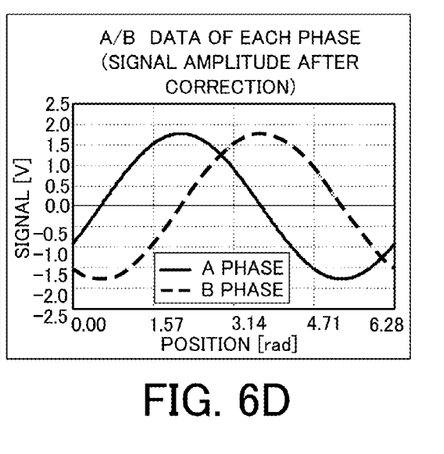

As a result, the correction of the amplitude is performed (FIG. 6D). Thus, the offsets of the A phase and the B phase signals are removed and the signal amplitudes are corrected to be the same, and signals 72 and 73 in which corrections of the signal amplitudes have been performed can be obtained after correcting the phase difference of 90 degrees.

Similarly to the case of the first track, a value 74 of arctangent (arctan) is calculated based on the output signals of the A phase and the B phase obtained by performing the corrections described above. Then, the vernier signal is obtained by calculating the difference of the value 64 of arctangent that is obtained from the output signals of the A phase and the B phase of the first track 42 and the value 74 of arctangent that is obtained from the output signals of the A phase and the B phase of the second track 43.

FIG. 7B illustrates a case in which a difference of the number of the slits 44 of the first track 42 and the slits 45 of the second track 43 is eight in a total length of the scale portion

41. The lateral axis indicates a position of the scale portion, and the vertical axis indicates a calculation value of arctangent of the vernier signals obtained from the first track 42 and the second track 43, which is indicated so as to be returned at ±πrad. In the present embodiment, eight-cycle vernier signals in the total length of the scale portion 41 are obtained. Thus, the calculator can obtain the middle-level signal 75 by performing the vernier calculation using the first signal and the second signal.

Subsequently, a method of obtaining an upper-level signal 82 will be described. As described above, the output of the light source 1 is fed back so as to be a constant value while the auto power control is performed based on the received light intensity that is obtained by the reflected light from the first track 42 entering the light receiving portion 9 or the amplitude of the signal obtained from the light receiving portion 9 to be normalized. As illustrated in FIGS. 3A and 3B, the slit 45 of the second track 43 is configured so that a reflective area is different in accordance with a position. Therefore, the received light intensity of the reflected light from the second track 43 by the light receiving portion 10 can be obtained as a value based on position information of the scale portion 41. Referring to FIGS. 7A to 7C, and 8, a flow of a processing 81 that converts the photocurrent obtained in accordance with this received light intensity into a voltage value by the current-voltage converter to be detected to obtain position information of the scale portion will be described.

Figure 8:
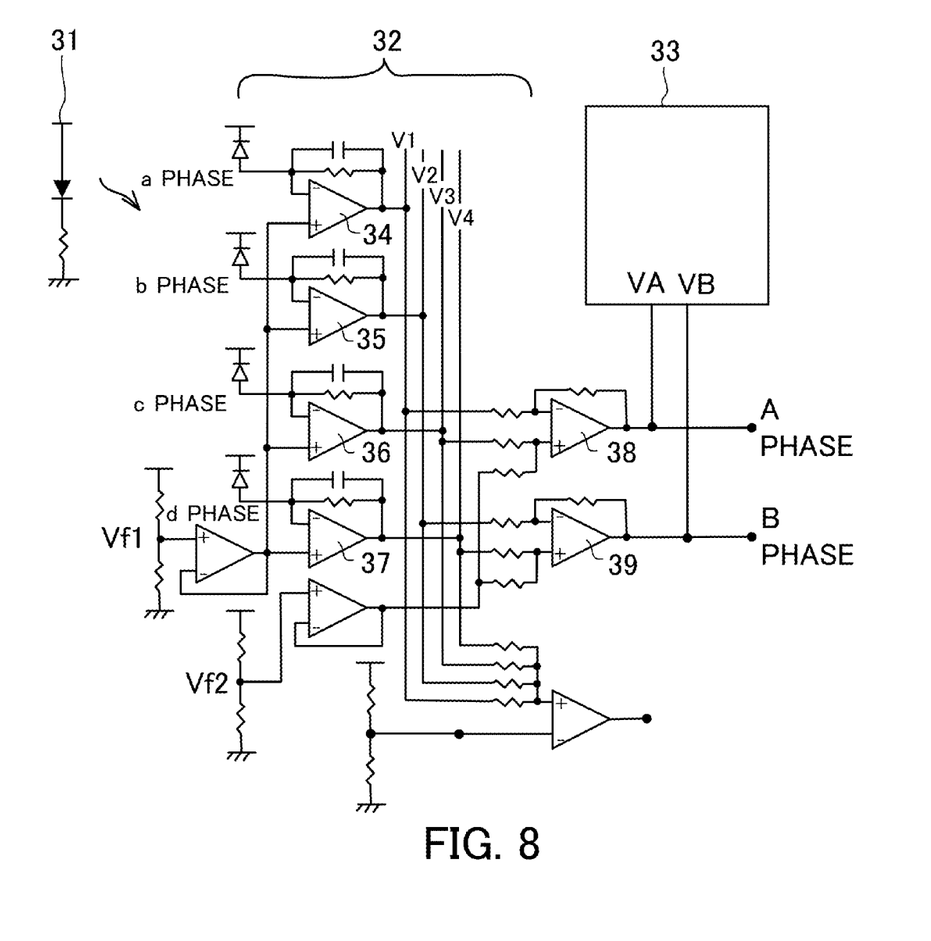
FIG. 8 is a configuration diagram of a signal processing circuit portion in the first embodiment.

FIG. 8 is a configuration diagram of the signal processing circuit portion 27 in the present embodiment. It is configured by including a light emitting circuit 31 of the light source 1 (the light emitting element) and an analog signal processor 32. Furthermore, it is provided with a position calculator 33 that calculates a moving amount of the scale portion 2 based on analog signals of the A phase and the B phase from the analog signal processor 32 to obtain a position of the object (the object to be measured). First-stage amplifiers 34, 35, 36, and 37 are I/V amplifiers that perform a current-voltage conversion of photocurrent generated by each of the photodiode groups of a phase, b phase, c phase, and d phase, which generate potentials of V1, V2, V3, and V4 with reference to Vf1. An A phase signal (VA) in which Vf2 is a bias potential is obtained by a differential output amplifier 38 that obtains a differential of the outputs V1 and V3 based on the photodiode groups of the a phase and the c phase. Similarly, a B phase signal (VB) is obtained by a differential output amplifier 39 that performs a differential amplification of the outputs V2 and V4 based on the photodiode groups of the b phase and the d phase. The signal processing circuit portion 27 calculates a signal corresponding to the position information of the scale portion 2 based on a value of V1+V2+V3+V4 that is a sum of these potentials. Thus, the calculator can obtain an upper-level signal 82 corresponding to the position information of the scale portion as illustrated in FIG. 7A based on a voltage value of the photocurrent obtained by the light receiving portion 10. More specifically, the calculator receives a light reflected on or transmitted through the slit 45 by the light receiving portion 10 to obtain the upper-level signal based on the voltage value obtained by converting the obtained photocurrent by the current-voltage converter. The calculator, along with the obtained upper-level signal, calculates the absolute position of the object based on the middle-level signal and the lower-level signal described above.

The track in which the slit (the pattern) of changing the reflected light intensity in the moving direction (the X axis direction) of the scale portion 2 is disposed may also be a first track in which intervals (pitches) of the four photodiodes in the light receiving portion is twice as long as the intervals of the track, instead of the second track. However, in this case, the upper-level signal 82 is obtained based on a voltage value that is converted from the light receiving amount received by the light receiving portion 9. Absolute position information 83 of the scale portion 2 is calculated by synchronizing each of the lower-level signal 65, the middle-level signal 75, and the upper-level signal 82 obtained as described above (FIGS. 7A to 7C).

Figure 9:
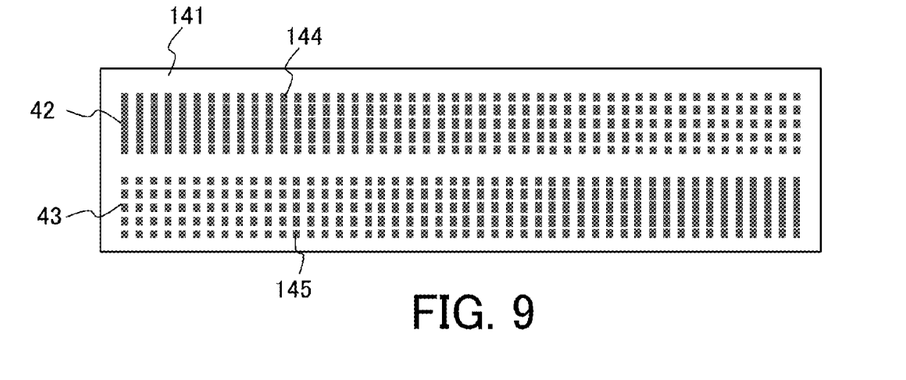
FIG. 9 is a plan view of a different type of a scale portion in the first embodiment.

In the present embodiment, as a scale portion 141 that is illustrated in FIG. 9, slits 144 and 145 configured so that modulation patterns (changing directions) of reflectances of the first track 42 and the second track 43 are directions opposite to each other may also be used. When the differential of the signals obtained from the light receiving portions 9 and 10 is calculated, a preferred signal as an upper-level signal can be obtained since a range of the signal is twice. In this case, the auto power control of the light source 1 is performed based on a sum of the received light intensities received by the light receiving portions 9 and 10 or a sum of the amplitudes of the signals obtained from the light receiving portions 9 and 10. In the present embodiment, the reflective absolute encoder is used, but the embodiment is not limited to this and can also be applied to a transmissive absolute encoder. The light source 1 and the light receiving portions 9 and 10 may also be configured separately.

Figure 10A:
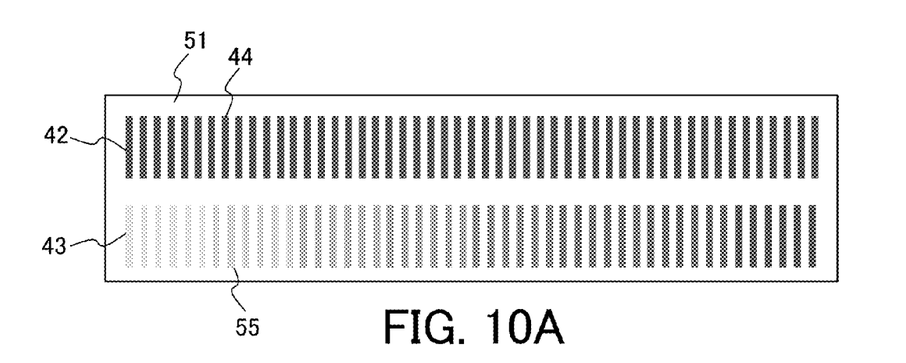
FIGS. 10A and 10B are plan views of a different type of a scale portion in the first embodiment.
Figure 10B:
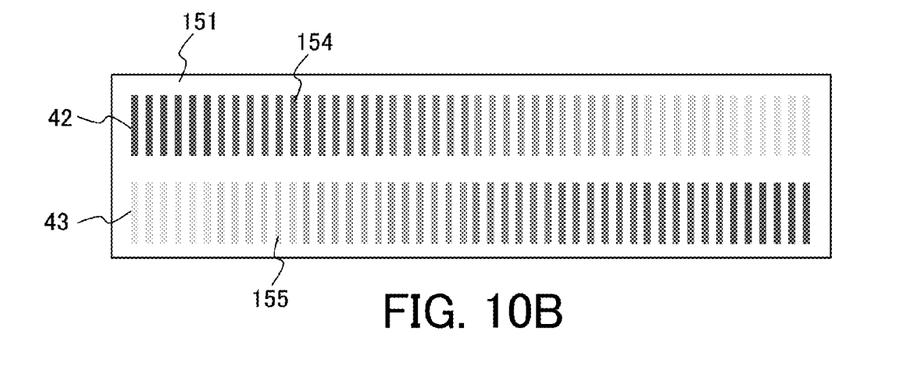

The slit (the reflective pattern or the light shielding pattern) of the second track in the scale portion is configured so that a reflective area or a light shielding area is different in accordance with its position, but the embodiment is not limited to this. As a slit portion 51 illustrated in FIG. 10A, a slit 55 of the second track 43 may also be formed using a film in which the reflectance or the transmittance of the light illuminated from the light source is different in accordance with a position in the moving direction of the scale portion. In this case, for example the density of the reflection film or the light shielding film is changed or the material of the reflection film or the light shielding film is changed to be able to form a slit in which the reflectance or the transmittance is changed. Similarly to the case of FIG. 9, as a scale portion 151 illustrated in FIG. 10B, slits 154 and 155 in which modulation patterns of the reflectances or the transmittances from the first track 42 and the second track 43 are arranged in directions opposite to each other may also be formed. In this case, since the range of the signal is twice, a preferred signal is obtained as an upper-level signal.

As described above, according to the absolute encoder using the vernier detection of the present embodiment, the absolute position information can be obtained without providing an absolute exclusive track. Therefore, a small-sized and low-cost absolute encoder can be provided. The auto power control is performed based on the received light intensity that is received by at least one of the two light receiving portions or the amplitude of the signal to be able to provide the highly-accurate absolute encoder without being affected by the change of the passage of time such as a variation of the light intensity of the light source. Furthermore, the reflective pattern (the slit) of the scale portion is formed by including missing patterns in a width direction of the scale portion at equal intervals or is formed by including uniform patterns in the width direction of the scale portion.

Therefore, the light intensity that enters the light receiving portion is substantially uniform, and a low-cost light source such as an LED can be used without using a lens.

(Second Embodiment)

Figure 11:
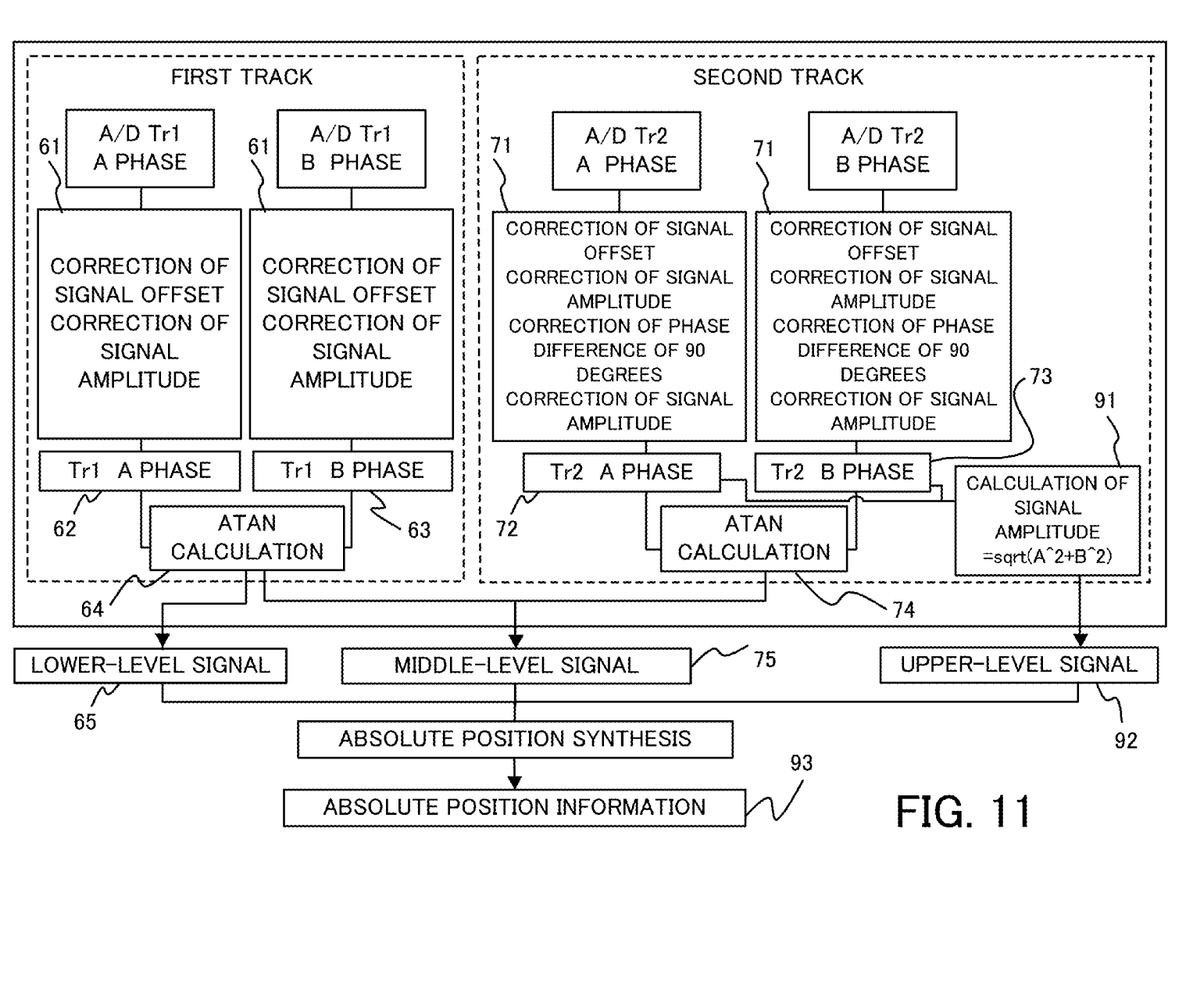
FIG. 11 is a diagram of a block and a flow of a signal processing in the second embodiment.
Figure 12A:
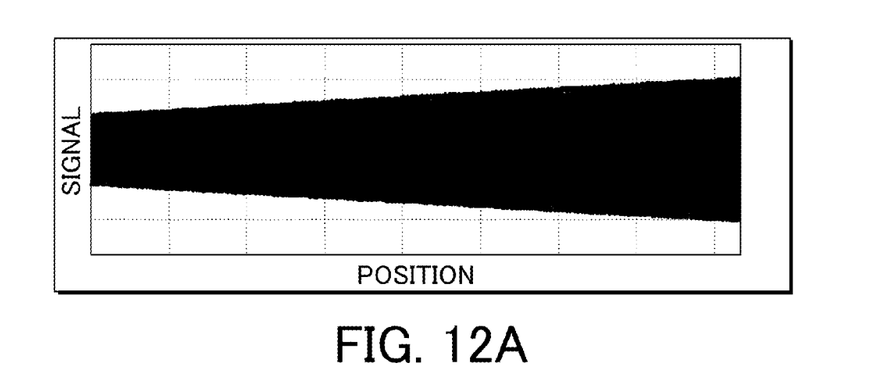
FIGS. 12A and 12B are diagrams of obtaining an upper-level signal in the second embodiment.
Figure 12B:
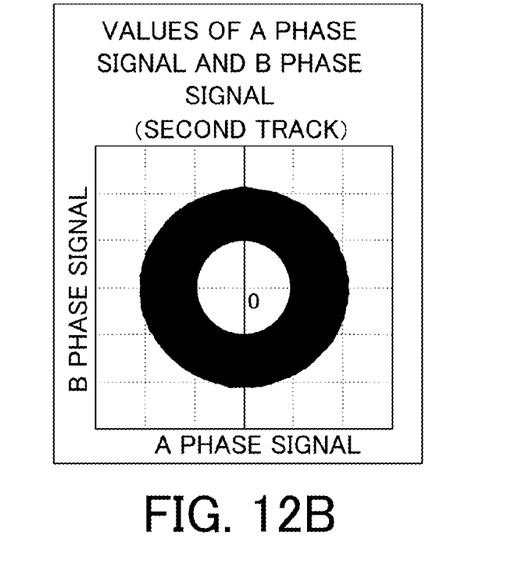

Next, referring to FIGS. 11, 12A, and 12B, a second embodiment of the present invention will be described. FIG. 11 is a diagram illustrating a processing block and a processing flow of a signal processing in the present embodiment. FIGS. 12A and 12B are diagrams of obtaining an upper-level signal in the present embodiment. Methods of obtaining a lower-level signal 65 obtained from the first track and a middle-level signal 75 obtained from a vernier signal of signals of the first and second tracks are the same as the methods of the first embodiment. Hereinafter, in the processing block and the processing flow of the signal processing in detecting absolute position information in the present embodiment, a method of obtaining an upper-level signal 92 that is different from the first embodiment will be described.

The upper-level signal 92 is, as illustrated in FIG. 11, obtained as Expression (13) by performing a calculation 91 of root mean square of values of the A phase signal and the B phase signal (signal amplification values) that are obtained from the second track of the scale portion.

$$\text{Root Mean Square} = \sqrt{(\text{Value of } A \text{ phase signal})^2 + (\text{Value of } B \text{ phase signal})^2} \quad (13)$$

Since the value of Expression (13) is different in accordance with a position of the scale portion, the position information of the object can be obtained based on the value obtained by Expression (13).

Subsequently, referring to FIGS. 12A and 12B, one example of a real signal will be described. A lateral axis in FIG. 12A indicates a position and a vertical axis indicates a signal amplitude, which indicates values of the A phase signal and the B phase signal (the second signal) obtained from the second track of the scale portion. FIG. 12B is a diagram in which a value of the A phase signal obtained from the second track of the scale portion is plotted for the lateral axis and a value of the B phase signal is plotted for the vertical axis. The signal indicated in FIGS. 12A and 12B is, similarly to the first embodiment, data in which various kinds of corrections of FIGS. 6A to 6D have been performed, and the distance from zero point to the plotted point in the drawing is an amplitude value of the signal (the second signal), which corresponds to a value of the root mean square of Expression (13).

Thus, the calculator can obtain the upper-level signal 92 by the calculation of Expression (13). In other words, the calculator obtains the upper-level signal based on the amplitude values of the A phase signal and the B phase signal constituting the second signal obtained by receiving the light reflected on or transmitted through the slit 45 by the light receiving portion 10. The upper-level signal 92 can be calculated regardless of the relation of the signal obtaining positions between the position of the light receiving portion and the position of the track, i.e. regardless of the phase states of the A phase signal and the B phase signal. Then, similarly to the first embodiment, the obtained lower-level signal 65, middle-level signal 75, and upper-level signal 92 are synchronized to calculate the absolute position information 93 of the scale portion 2.

The configuration of the present embodiment is especially effective when it is difficult to obtain a large amount of modulation as an upper-level signal based on the position of the scale portion since the influence of a stray light such as a reflected light in the sensor unit is large. In this case, it is advantageous that the upper-level signal is obtained as described in the present embodiment to be able to obtain a large-modulated upper-level signal compared with the first embodiment and that it is easy to guarantee the synchronization in obtaining the absolute position information.

According to each embodiment described above, a small-sized, low-cost, and highly-accurate absolute encoder can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-153098, filed on Jul. 5, 2010, which is hereby incorporated by reference herein in its entirety.

What is claimed is:

1. An absolute encoder that measures an absolute position of an object, the absolute encoder comprising:
    a scale portion configured to be movable along with the object, and including a first track having a plurality of first slits formed at a first interval and a second track having a plurality of second slits formed at a second interval different from the first interval;
    a light source configured to illuminate a light onto the first slits and the second slits;
    a first detector configured to detect a first signal that is obtained from a light reflected by or transmitted through the first track;
    a second detector configured to detect a second signal that is obtained from a light reflected by or transmitted through the second track; and
    a calculator configured to calculate the absolute position of the object based on the first signal and the second signal,
    wherein the second slits are configured so that a reflected light intensity or a transmitted light intensity of the light illuminated from the light source is different in accordance with a position in a moving direction of the scale portion, and
    wherein the calculator is configured to:
    obtain an upper-level signal based on a voltage value of photocurrent obtained by the second detector or an amplitude value of the second signal;
    obtain a middle-level signal by performing a vernier calculation using the first signal and the second signal;
    obtain a lower-level signal by performing an arctangent calculation using the first signal; and
    calculate the absolute position of the object based on the upper-level signal, the middle-level signal, and the lower-level signal.

2. The absolute encoder according to claim 1, wherein the second slits are configured so that a reflective area or a transmissive area of the light illuminated from the light source is different in accordance with the position in the moving direction of the scale portion.

3. The absolute encoder according to claim 1, wherein the second slits are formed by a film in which a reflectance or a transmittance of the light illuminated from the light source is different in accordance with the position in the moving direction of the scale portion.

4. The absolute encoder according to claim 1, further comprising:
    a current-voltage converter that converts the photocurrent from the light detected by the second detector to the voltage value,
    wherein the calculator obtains the upper-level signal based on the voltage value obtained from the current-voltage converter.

5. The absolute encoder according to claim 1, wherein the calculator obtains the upper-level signal based on the amplitude values of an A phase signal and a B phase signal constituting the second signal from the second detector.

6. The absolute encoder according to claim 1, wherein the calculator controls the intensity of the light source is based on a received light intensity received by at least one of the first detector or the second detector or an amplitude of a signal obtained from at least one of the first detector or the second detector.

7. The absolute encoder according to claim 1, wherein:
the first slits are configured so that the reflected light intensity or the transmitted light intensity of the light illuminated from the light source is different in accordance with a position in a moving direction of the scale portion, and
a direction of changing the reflected light intensity or the transmitted light intensity for the first slits is opposite to a direction of changing the reflected light intensity or the transmitted light intensity for the second slits.

8. A method of measuring an absolute position of an object using an absolute encoder, the absolute encoder comprising:
a scale portion configured to be movable along with the object and including a first track having a plurality of first slits formed at a first interval and a second track having a plurality of second slits formed at a second interval different from the first interval;
a light source configured to illuminate a light onto the first slits and the second slits;
a first detector configured to detect a first signal that is obtained from a light reflected by or transmitted through the first track;
a second detector configured to detect a second signal that is obtained from a light reflected by or transmitted through the second track; and
a calculator configured to calculate the absolute position of the object based on the first signal and the second signal,
wherein the second slits are configured so that a reflected light intensity or a transmitted light intensity of the light illuminated from the light source is different in accordance with a position in a moving direction of the scale portion,
wherein the method comprises the steps of:
obtaining an upper-level signal based on a voltage value of photocurrent obtained by the second detector or an amplitude value of the second signal;
obtaining a middle-level signal by performing a vernier calculation using the first signal and the second signal;
obtaining a lower-level signal by performing an arctangent calculation using the first signal; and
calculating the absolute position of the object based on the upper-level signal, the middle-level signal, and the lower-level signal.

\* \* \* \* \*